US010956397B2

(12) United States Patent
Liu et al.

(10) Patent No.: US 10,956,397 B2
(45) Date of Patent: Mar. 23, 2021

(54) METHOD AND APPARATUS FOR PROCESSING CONCURRENT TRANSACTIONS, AND STORAGE MEDIUM

(71) Applicant: Wuxi Research Institute of Applied Technologies Tsinghua University, Jiangsu (CN)

(72) Inventors: Leibo Liu, Jiangsu (CN); Zhaoshi Li, Jiangsu (CN); Shaojun Wei, Jiangsu (CN)

(73) Assignee: Wuxi Research Institute of Applied Technologies Tsinghua University, Wuxi (CN)

( * ) Notice: Subject to any disclaimer, the term of this patent is extended or adjusted under 35 U.S.C. 154(b) by 0 days.

(21) Appl. No.: 16/680,595

(22) Filed: Nov. 12, 2019

(65) Prior Publication Data
US 2020/0334225 A1    Oct. 22, 2020

(30) Foreign Application Priority Data

Apr. 16, 2019  (CN) .......................... 201910307348.8

(51) Int. Cl.
*G06F 16/23*  (2019.01)
*G06F 16/901*  (2019.01)
(Continued)

(52) U.S. Cl.
CPC ........ *G06F 16/2315* (2019.01); *G06F 16/285* (2019.01); *G06F 16/9024* (2019.01); *G06F 17/16* (2013.01)

(58) Field of Classification Search
CPC ............. G06F 16/2315; G06F 16/9024; G06F 16/285; G06F 17/16
See application file for complete search history.

(56) References Cited

U.S. PATENT DOCUMENTS

| 5,280,619 A | * | 1/1994 | Wang | G06F 16/2343 |
| | | | | 710/200 |
| 2012/0054560 A1 | * | 3/2012 | Adir | G06F 11/3664 |
| | | | | 714/54 |

FOREIGN PATENT DOCUMENTS

CN         103677771 A      3/2014

OTHER PUBLICATIONS

Li Jian. "A Research on Long Transaction Processing Mechanism Based on the Workflow." Master's Thesis of Chongqing University. Apr. 2009. (English translation attached).
(Continued)

*Primary Examiner* — Charles D Adams
(74) *Attorney, Agent, or Firm* — Posz Law Group, PLC

(57) ABSTRACT

The present disclosure provides a method and an apparatus for processing concurrent transactions, and a non-transitory computer readable storage medium. The method includes: determining whether a two-dimensional digraph for a set of concurrent transactions has a cyclic structure, wherein the set of concurrent transactions comprises a transaction to be committed and at least one committed transaction, the two-dimensional digraph comprises a plurality of nodes corresponding respectively to the transactions in the set, and directed edges between the nodes of the two-dimensional digraph indicate a serializability relation among the transactions in the set; aborting the transaction to be committed if it is determined that the two-dimensional digraph has the cyclic structure; and committing the transaction to be committed if it is determined that the two-dimensional digraph does not have the cyclic structure. Embodiments of the present disclosure can improve the performance of a concurrent system.

11 Claims, 5 Drawing Sheets

(51) Int. Cl.
*G06F 17/16* (2006.01)
*G06F 16/28* (2019.01)

(56) References Cited

OTHER PUBLICATIONS

Office action dated Feb. 6, 2020 issued in corresponding CN patent application No. 201910307348.8 (and English machine translation attached).

* cited by examiner

METHOD AND APPARATUS FOR PROCESSING CONCURRENT TRANSACTIONS, AND STORAGE MEDIUM

CROSS-REFERENCE TO RELATED APPLICATIONS

This application is based on and claims priority to Chinese Patent Application No. 201910307348.8, filed on Apr. 16, 2019, in Chinese Intellectual Property Office, the disclosure of which is incorporated by reference herein in its entirety.

TECHNICAL FIELD

The present disclosure relates to the field of transaction processing, and more particularly to a method and an apparatus for processing concurrent transactions, and a storage medium.

BACKGROUND

In concurrency control systems such as database and transactional memory, scheduling is performed in unit of transaction. In design of a real concurrency control system, transactions may be added with more strict correctness conditions. These correctness conditions are generally referred to as semantics in programming languages. Semantics that is the most intuitive to humans is serializability, and Concurrency control algorithms aim to forming a transaction scheduling table with serializability.

The existing concurrency control algorithms are mainly classified as (1) Pessimistic Concurrency Control algorithm and (2) Optimistic Concurrency Control algorithm. The Pessimistic Concurrency Control algorithm generally adopts a concurrency control mechanism based on a lock protocol. If an operation performed by a user requests a lock, any other user cannot perform an operation colliding with the lock until the lock is released by the owner of the lock. The pessimistic concurrency control algorithm causes a large number of transactions to be aborted, so its concurrency performance is poor. The Optimistic Concurrency Control algorithm, when each transaction is executed, initially optimistically assumes that data that is accessed has not modified by any other concurrent transaction. Then, after the execution of the transaction is completed, the algorithm checks whether each transaction meets this assumption. Thus, the optimistic concurrency control algorithm does not require locking of data. A system that employs the optimistic concurrency control algorithm has a better concurrency performance than that employs the pessimistic control algorithms.

In conventional optimistic concurrency control algorithms, in order to independently check the serializability of each transaction, additional constraints need to be added, which makes the resultant semantics more constrained than the serializability semantics. As a result, some transactions that could have been committed are aborted, weakening the concurrency performance of the system.

SUMMARY

In view of at least the above problems in the conventional concurrency control mechanism, embodiments of the present disclosure provide a method and an apparatus for processing concurrent transactions, which can avoid the problem of excessive constraint in the conventional optimistic concurrency control algorithm, reduce the aborting ratio of transactions and thereby improve the performance of a concurrent system.

One aspect of the present disclosure provides a method of processing concurrent transactions. The method includes: determining whether a two-dimensional digraph for a set of concurrent transactions has a cyclic structure, wherein the set of concurrent transactions comprises a transaction to be committed and at least one committed transaction, the two-dimensional digraph comprises a plurality of nodes corresponding respectively to the transactions in the set, and directed edges between the nodes of the two-dimensional digraph indicates a serializability relation among the transactions in the set; aborting the transaction to be committed if it is determined that the two-dimensional digraph has the cyclic structure; and committing the transaction to be committed if it is determined that the two-dimensional digraph does not have the cyclic structure.

Another aspect of the present disclosure provides an apparatus for processing concurrent transactions. The apparatus includes one or more processors and a memory for storing one or more programs. The one or more programs, when executed by the one or more processors, cause the one or more processors to: determine whether a two-dimensional digraph for a set of concurrent transactions has a cyclic structure, wherein the set of concurrent transactions comprises a transaction to be committed and at least one committed transaction, the two-dimensional digraph comprises a plurality of nodes corresponding respectively to the transactions in the set, and directed edges between the nodes of the two-dimensional digraph indicates a serializability relation among the transactions in the set; abort the transaction to be committed if it is determined that the two-dimensional digraph has the cyclic structure; and commit the transaction to be committed if it is determined that the two-dimensional digraph does not have the cyclic structure.

Another aspect of the present disclosure provides a non-transitory computer readable storage medium having stored thereon instructions for performing the above method.

BRIEF DESCRIPTION OF THE DRAWINGS

For a more complete understanding of the present disclosure and its advantages, reference will now be made to the description made in conjunction with the following accompanying drawings, in which.

DETAILED DESCRIPTION

Figure 1:
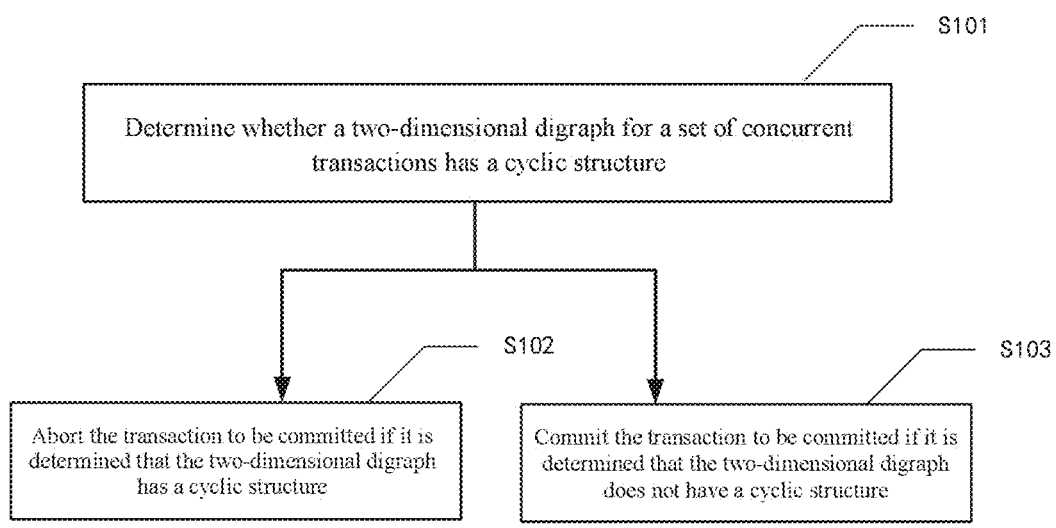
FIG. 1 is a schematic flow chart of a method of processing concurrent transactions according to an embodiment of the present disclosure.

Hereinafter, embodiments of the present disclosure will be described with reference to the accompanying drawings. However, it should be understood that the description is only illustrative, and is not intended to limit the scope of the invention. In addition, the description of well-known structures and techniques is omitted in the following description in order to avoid unnecessarily obscuring the inventive concept. In addition, in the present disclosure, various embodiments and technical features in the embodiments provided below may be combined with each other in any manner.

The terminology used herein is merely for the purpose of describing particular embodiments, and is not intended to limit the invention. In addition, as used herein, the terms "including", "comprising", etc. are used to indicate the presence of the described features, steps, operations and/or components, but do not exclude the presence or addition of one or more other features, steps, operations or components. All terms (including technical terms and scientific terms) used herein have the meaning commonly understood by one of ordinary skill in the art, unless otherwise defined. It should be noted that the terms used herein are to be interpreted as having a meaning consistent with the context of the present specification and should not be interpreted in an ideal or too rigid manner.

Some block diagrams and/or flowcharts are illustrated in the drawings. It will be understood that some blocks or combinations thereof in the block diagrams and/or flowcharts can be implemented by computer program instructions. These computer program instructions may be provided to a processor of a general purpose computer, a dedicated computer or other programmable data processing apparatus, such that when executed by the processor, the instructions may cause to create an apparatus for implementing the functions/operations illustrated in the block diagrams and/or flowcharts.

Thus, the techniques of this disclosure may be implemented in the form of hardware and/or software (including firmware, microcode, etc.). Additionally, the techniques of this disclosure may take the form of a computer program product on a computer readable medium storing instructions for use by or in conjunction with an instruction execution system. In the context of the present disclosure, the computer readable medium can be any medium that can contain, store, communicate, propagate or transmit the instructions. For example, the readable storage medium may include, but is not limited to, an electronic, magnetic, optical, electromagnetic, infrared, or semiconductor system, apparatus, device, or propagation medium. Specific examples of the readable storage medium may include: a magnetic storage apparatus such as a magnetic tape or a hard disk (HDD); an optical storage apparatus such as a compact disk (CD-ROM); a memory such as a random access memory (RAM) or a flash memory; and/or a wired/wireless communication link.

An access collision may occur when multiple threads access the same data synchronously. For example, assume that a thread 1 and a thread 2 are two threads executed in parallel. The thread 1 reads data in an address addr1, and the thread 2 writes data to the address addr1. The two operations occurring in different sequences will lead to different execution results. Alternatively, in the case where both the thread 1 and the thread 2 write data to the address addr1, different sequences of write operations will also lead to different execution results. Therefore, when two threads access or change the same data entry, concurrency control is required to ensure data validity or memory consistency.

In concurrency control systems such as database and transactional memory, scheduling is performed in unit of transaction, and transactions are scheduled according to a serialization schedule table formed by a concurrency control algorithm. Serializability means that a result from concurrent execution of multiple transactions should be equivalent to a result from serial execution of these transactions in a certain order. In the optimistic concurrency control algorithm, it is initially optimistically assumed that the data accessed by a transaction has not been modified by any other concurrent transaction. After the execution of the transaction is completed, it is verified whether the assumption is met according to serializability semantics. If the assumption is not met, the transaction is to be aborted. If the assumption is met, the execution result of the transaction is committed.

The conventional optimistic concurrency control algorithm has excessively constrained semantics, so that a ratio of aborted transactions increases, thereby degrading concurrency performance of the system. In view of the conventional optimistic concurrency control algorithm, the present disclosure provides a method, an apparatus and a concurrency control system for processing concurrent transactions, which may use a two-dimensional digraph (i.e., directed graph) to indicate a serializability relation between transactions in a set of concurrent transactions, and determine whether to commit a transaction to be committed according to the structure of the two-dimensional digraph. With the technical solution according to embodiments of the present disclosure, the problem of excessive constraint in the conventional optimistic concurrency control algorithm can be avoided, and the ratio of aborted transactions can be reduced. Therefore, embodiments of the present disclosure can improve the performance of concurrent systems.

It should be understood that the database and the transactional memory are merely two examples of concurrency control systems. The embodiments of the present disclosure are not limited to the two concurrency control scenarios of database and transactional memory, and can also be used for transaction processing of other concurrency control systems.

FIG. 1 shows a schematic flow chart of a method of processing concurrent transactions according to an embodiment of the present disclosure. As illustrated in FIG. 1, the method includes operations S101 to S103.

In operation S101, it is determined whether a two-dimensional digraph for a set of concurrent transactions has a cyclic structure. The set of concurrent transactions includes a transaction to be committed and at least one committed transaction. The nodes of the two-dimensional digraph correspond respectively to the transactions in the set, that is, each of the transactions in the set is represented by a different one of the nodes of the two-dimensional digraph. The directed edges between the nodes of the two-dimensional digraph indicate a serializability relation among the transactions in the set.

One transaction generally contains a series of read/write operations. According to the definition of a transaction, a transaction should have properties of atomicity and isolation. Atomicity means that all read/write operations in one transaction should be either committed together or aborted together. Isolation means that there is no mutual influence between concurrent transactions. During the concurrency control procedure, the serializability relation between transactions (i.e., the order in which transactions are scheduled) may be determined according to the read/write operations contained in the transactions. The set of concurrent transactions and the two-dimensional digraph are described below with reference to detailed examples.

Figure 2A:
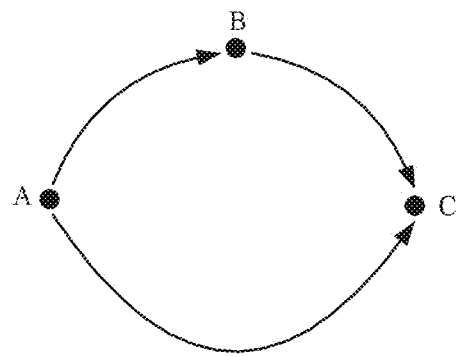
FIG. 2a is a two-dimensional digraph for a set of concurrent transactions according to an embodiment of the present disclosure.
Figure 2B:
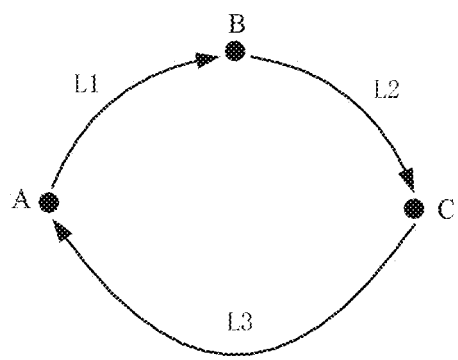
FIG. 2b is a two-dimensional digraph for a set of concurrent transactions according to another embodiment of the present disclosure.
Figure 2C:
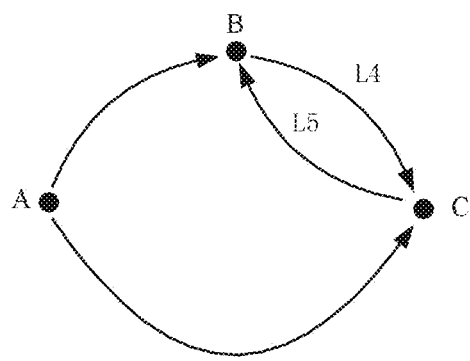
FIG. 2c is a two-dimensional digraph for a set of concurrent transactions according to another embodiment of the present disclosure.

It is assumed that the set of concurrent transactions includes one transaction to be committed $t_3$ and two committed transactions $t_1$ and $t_2$. FIGS. 2a-2c show three types of two-dimensional digraphs for a set of concurrent transactions, respectively. Each of the two-dimensional digraphs showed in FIGS. 2a-2c includes three nodes: Node A, Node B, and Node C. Node A, Node B, and Node C correspond to the transaction $t_1$, the transaction $t_2$, and the transaction $t_3$, respectively. The directed edge between Node A and Node B and directed from Node A to Node B indicates that the transaction $t_1$ should precede the transaction $t_2$ according to the serializability semantics. The other directed edges have similar indications, and details thereof will be omitted herein.

In operation S102, if the two-dimensional digraph has a cyclic structure, the transaction to be committed is aborted. For example, if a cyclic structure is generated upon the node corresponding to the transaction to be committed being added to the two-dimensional digraph according to the serializability semantics, the transaction to be committed is aborted.

As illustrated in FIG. 2b and FIG. 2c, after Node C corresponding to the transaction $t_3$ is added to the two-dimensional digraph according to the serializability semantics, the two-dimensional digraph has a cyclic structure. Specifically, as illustrated in FIG. 2b, a directed edge L1, a directed edge L2, and a directed edge L3 form a cyclic structure of a two-dimensional digraph. As illustrated in FIG. 2c, a directed edge L4 and a directed edge L5 form a cyclic structure of a two-dimensional digraph. In the technical solution according to the embodiment of the present disclosure, the transaction $t_3$ to be committed should be aborted whenever there is a cyclic structure as illustrated in FIG. 2b or FIG. 2c.

In operation S103, if the two-dimensional digraph does not have a cyclic structure, the transaction to be committed is committed. For example, if directed edges between respective nodes in the two-dimensional digraph cannot form a cyclic structure upon the node corresponding to the transaction to be committed being added to the two-dimensional digraph according to serializability semantics, the transaction to be committed is committed. As illustrated in FIG. 2a, after Node C corresponding to the transaction $t_3$ is added to the two-dimensional digraph according to the serializability semantics, the two-dimensional digraph does not have a cyclic structure, and thus the transaction $t_3$ to be committed will be committed.

According to the above technical solution of the present disclosure, the problem of excessive constraint in the conventional optimistic concurrency control algorithm can be avoided, thereby reducing the ratio of aborted transactions. Therefore, embodiments of the present disclosure can improve the performance of a concurrent system.

It should be understood that, a common mathematical tool used to store the two-dimensional digraph in a computer is a matrix. Thus, both using a two-dimensional digraph to represent a serializability relation between transactions and using a matrix to represent a serializability relation between transactions should fall within the scope of embodiments of the present disclosure. For example, an adjacent matrix may be used to represent a two-dimensional digraph. The two-dimensional digraph illustrated in FIG. 2a may be represented with the adjacent matrix M as follows:

$$M = \begin{bmatrix} 0 & 1 & 1 \\ 0 & 0 & 1 \\ 0 & 0 & 0 \end{bmatrix}$$

Each of elements in the matrix M is defined as follows. M[1][2]=1 indicates that there is a directed edge pointed from transaction $t_1$ to transaction $t_2$, and M[2][1]=0 indicates that there is no directed edge pointed from transaction $t_2$ to transaction $t_1$. In addition, according to the definition of the directed edge, there is no directed edge between each transaction and itself. Therefore, the diagonal elements in the adjacent matrix M are usually set to zero. It should also be understood that the value of each element in the above adjacent matrix M is merely an example, and may be adjusted as needed in particular implementations.

Further, the definitions of the foregoing adjacent matrix M and its elements are simply an example of the implementation of the present disclosure, and the embodiments of the present disclosure are not limited thereto. For example, an implementation of using a reachability relation matrix to represent reachability relation between the nodes in the two-dimensional digraph will be described in detail below. The reachability relation matrix may be obtained from the two-dimensional digraph, or derived from the adjacent matrix of the two-dimensional digraph. However, unlike an adjacent matrix, a reachability relation matrix does not correspond to only one two-dimensional digraph. In particular, a two-dimensional digraph may have a unique reachability relation matrix, while a reachability relation matrix may represent more than one two-dimensional digraphs. As another example, a two-dimensional digraph may be saved using a cross-linked list method, and accordingly the Floyd pointer-chasing algorithm may be used to identify whether the two-dimensional digraph has a cyclic structure. Therefore, no matter what mathematical tool is used to represent a two-dimensional digraph, it should fall within the scope of the present disclosure as long as it does not depart from the general concept of the present disclosure.

Alternatively, in an embodiment of the present disclosure, when determining whether the two-dimensional digraph for the set of concurrent transactions has a cyclic structure, it may be determined whether a combination of a first node and a second node exists among the nodes of the two-dimensional digraph. The first node may reach the second node along one or more directed edges, and the second node may reach the first node along one or more directed edges. When the combination of the first node and the second node exists among the nodes of the two-dimensional digraph, it is determined that the two-dimensional digraph has a cyclic structure. When the combination of the first node and the second node does not exist among the nodes of the two-dimensional digraphs, it is determined that the two-dimensional digraph does not have a cyclic structure.

For example, the Floy-Warshall algorithm or the topological sorting algorithm may be used to sequentially traverse the nodes of the two-dimensional digraph to determine whether the first node and the second node are present. When each of the nodes in the two-dimensional digraph can satisfy only the condition that the second node may be reached from the first node along one or more directed edges, but cannot satisfy the condition that the first node may be reached from the second node along one or more directed edges, it can be considered that the above first node or second node is not present.

Alternatively, in an embodiment of the present disclosure, when determining whether a combination of a first node and a second node exists among the nodes of the two-dimensional digraph, a forward adjacent vector and a backward adjacent vector between a transaction to be committed and at least one committed transaction may be determined firstly, and then it may be determined whether a combination of a first node and a second node exists among the nodes of the two-dimensional digraph according to the forward adjacent vector, the backward adjacent vector, and the reachability relation matrix of the at least one committed transaction.

The forward adjacent vector is used to indicate whether there is a directed edge directed away from the transaction to be committed between the transaction to be committed and each of the at least one committed transaction, and the backward adjacent vector is used to indicate whether there is a directed edge directed to the transaction to be committed between the transaction to be committed and each of the at least one committed transaction. The reachability relation matrix is used to represent reachability relations between respective ones of the at least one committed transaction. It should be understood that, when determining whether the two-dimensional digraph has a cyclic structure according to the technical solution of the embodiment of the present disclosure, if it is determined that the two-dimensional digraph has a cyclic structure, one of the first node and the second node is the node corresponding to the transaction to be committed, and the other node is the node corresponding to the committed transaction.

The embodiment of the present disclosure determines whether the two-dimensional digraph has a cyclic structure according to the reachability relations between the transaction to be committed and each of the committed transactions. Compared with a scheme of traversing the nodes of the two-dimensional digraph, the embodiment of the present disclosure greatly reduces the amount of computation, thereby improving the operation efficiency of the concurrency control system.

For example, as illustrated in FIG. 2a, the directed edge between Node C and Node B indicates that there is a directed edge directed to transaction $t_3$ between the transaction to be committed $t_3$ and committed transaction $t_2$. The directed edge between Node C and Node A indicates that there is a directed edge directed to transaction $t_3$ between transaction to be committed $t_3$ and committed transaction $t_1$. Thus, according to FIG. 2a, there is no directed edge directed away from the transaction to be committed $t_3$, and there are two directed edges directed to the transaction to be committed $t_3$. In this case, the forward adjacent vector f may be expressed as f={0,0,1}, and the backward adjacent vector b may be expressed as b={1,1,1}.

Similarly, according to the two-dimensional digraph as illustrated in FIG. 2b, the forward adjacent vector f of the transaction to be committed $t_3$ may be expressed as f={1,0,1}, the backward adjacent vector b of the transaction to be committed $t_3$ may be expressed as b={0,1,1}, According to the two-dimensional digraph as illustrated in FIG. 2c, the forward adjacent vector f of the transaction to be committed $t_3$ may be expressed as f={0,1,1}, and the backward adjacent vector b of the transaction to be committed $t_3$ may be expressed as b={1,1,1}.

It should be understood that the reachability relation indicates whether the nodes corresponding to the respective transactions can reach each other along directed edges. For example, assume that a set T of the at least one committed transaction contains k transactions, and is denoted as:

$$T=\{t_1, t_2, \ldots t_k\}$$

$t_i \triangleleft t_j$ indicates that the transaction $t_i$ can reach the transaction $t_j$ along one or more directed edges, $t_i \rightarrow t_j$ indicates the presence of one or more directed edges directed from the transaction $t_i$ to the transaction $t_j$. $t_i \triangleleft t_j$ may be defined:

$$t_i \triangleleft t_j \Leftrightarrow t_i \rightarrow t_j, \text{ or } \exists t_m \in T, t_i \rightarrow t_m \text{ and } t_m \triangleleft t_j$$

where $1 \leq i,j,m \leq k$. That is, the transaction $t_i$ can reach the transaction $t_j$ if and only if: there is one or more directed edges directed from the transaction $t_i$ to the transaction $t_j$; or there is such a transaction $t_m$ that the transaction $t_m$ can reach the transaction $t_j$, and there is one or more directed edges directed from the transaction $t_i$ to the transaction $t_m$.

Similarly, $t_i \triangleright t_j$ indicates that the transaction $t_j$ can reach the transaction $t_i$ along one or more directed edges, $t_i \leftarrow t_j$ indicates the presence of one or more directed edges directed from the transaction $t_j$ to the transaction $t_i$. Then $t_i \triangleright t_j$ may be defined as:

$$t_i \triangleright t_j \Leftrightarrow t_i \leftarrow t_j, \text{ or } \exists t_m \in T, t_i \leftarrow t_m \text{ and } t_m \triangleright t_j$$

where $1 \leq i,j,m \leq k$. That is, the transaction $t_j$ can reach the transaction $t_i$ if and only if: there is one or more directed edges directed from the transaction $t_j$ to the transaction $t_i$; or there is such a transaction $t_m$, that the transaction $t_j$ can reach the transaction $t_m$, and there is one or more directed edges directed from the transaction $t_m$ to the transaction $t_i$.

For example, a reachability relation matrix of the at least one committed transaction is described below by taking FIG. 2a as an example. According to FIG. 2a, the at least one committed transaction includes transaction $t_1$ and transaction $t_2$. Meanwhile, according to the definition of reachability relation, each transaction can reach itself, and thus diagonal elements in the reachability relation matrix may be set to 1. The reachability relation matrix of the two-dimensional digraph illustrated in FIG. 2a may be expressed as:

$$R_1 = \begin{bmatrix} 1 & 1 \\ 0 & 1 \end{bmatrix}$$

It should be understood that the value of each of the elements in the above reachability relation matrix is simply an example, and may be adjusted as needed in particular implementations. For example, the values in the above matrix may be inverted by using 0 to indicate reachability and 1 to indicate unreachability. Therefore, regardless of values used to represent the reachability relation matrix, it should fall within the scope of the present disclosure as long as it does not depart from the definition of the reachability relation matrix.

Alternatively, in an embodiment of the present disclosure, when determining a forward adjacent vector and a backward adjacent vector between the transaction to be committed and the at least one committed transaction, the forward adjacent vector and the backward adjacent vector may be determined based on a read-write collision or a write-write collision for the shared object between a read/write operation in the transaction to be committed and a read/write operation in each of the at least one committed transaction.

For example, as described above, assume that at least one committed transaction forms a set $T=\{t_1, t_2, \ldots t_k\}$, where $t_i \in T$, $1 \le i \le k$, and $t_{k+1}$ represents a transaction to be committed. Then, when determining the forward adjacent vector and the backward adjacent vector between the transaction $t_{k+1}$ and the transaction $t_i$, the forward adjacent vector and the backward adjacent vector may be determined based on read/write operations in the transaction $t_{k+1}$ and the transaction $t_i$ with respect to the shared object, respectively. For example, when it is determined that a directed edge from transaction $t_{k+1}$ to transaction $t_i$ should be established between transaction $t_{k+1}$ and transaction $t_i$ according to any of the read/write operations contained in transaction $t_{k+1}$, it is determined that the directed edge exists. Similarly, when it is determined that a directed edge from transaction $t_i$ to transaction $t_{k+1}$ should be established between transaction $t_{k+1}$ and transaction $t_i$ according to any of the read/write operations contained in transaction $t_{k+1}$, it is determined that the directed edge exists. When there is a read-write collision or a write-write collision between the transaction $t_{k+1}$ and the transaction $t_i$ caused by multiple read/write operations, there may exist bidirectional directed edges L4 and L5 between the transaction $t_{k+1}$ and the transaction $t_i$ as illustrated in FIG. 2c.

In particular, the determining of the forward adjacent vector and the backward adjacent vector based on any of the read/write operations included in the transaction may be performed as follows.

When a read-write collision for the shared object occurs between the transaction to be committed and any of the at least one committed transaction, if the transaction performing a read operation does not read the result of the operation of the transaction performing a write operation, then a directed edge directed to the transaction performing the read operation is established; and if the transaction performing a read operation reads the result of the operation of the transaction performing a write operation, a directed edge directed away from the transaction performing the read operation is established. When a write-write collision for the shared object occurs between the transaction to be committed and any of the at least one committed transaction, a directed edge directed to the transaction to be committed is established. The forward adjacent vector and the backward adjacent vector are determined based on the above established directed edges.

Alternatively, in an embodiment of the present disclosure, the shared object is a memory address or a primary key value of a relation database. For example, in a database system, the shared object is a primary key value. In a transactional memory system, the shared object is a memory address.

Alternatively, in an embodiment of the present disclosure, when determining whether there is a combination of a first node and a second node among nodes of the two-dimensional digraph according to the forward adjacent vector, the backward adjacent vector, and the reachability relation matrix of the at least one committed transaction, the process for determining whether there is a combination of a first node and a second node may be based on the following formulas (1) and (2):

$$p = f + R^T \times f; \quad (1)$$

$$s = b + R \times b; \quad (2)$$

If $p^T \times s \ne 0$, it is determined that there is a combination of a first node and a second node among the nodes of the two-dimensional digraph; if $p^T \times s = 0$, it is determined that there is no combination of a first node or a second node among the nodes of the two-dimensional digraph. Here, f denotes the forward adjacent vector, b denotes the backward adjacent vector, R denotes the reachability relation matrix, $R^T$ denotes a transposed matrix of R, p denotes a forward reaching vector, and s denotes a backward reaching vector, $p^T$ denotes a transposed vector of p, the operational symbol + denotes the matrix addition in the Boolean algebra, and the operational symbol × denotes the matrix multiplication in the Boolean algebra.

Figures 3A, 3B:
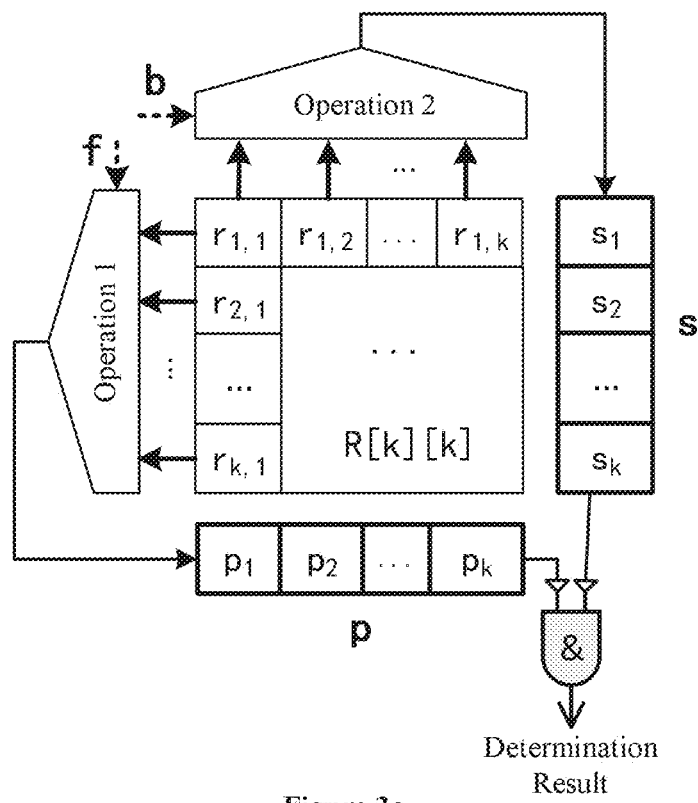
FIG. 3a is a schematic flow chart of a process for determining whether a two-dimensional digraph has a cyclic structure according to an embodiment of the present disclosure.
FIG. 3b is a schematic diagram of an updated reachability relation matrix according to an embodiment of the present disclosure.

As described above, assume that a set T of the at least one committed transaction contains k transactions and is denoted as $T = \{t_1, t_2, \ldots t_k\}$. FIG. 3a is a schematic flow chart for the process of determining whether a two-dimensional digraph has a cyclic structure according to an embodiment of the present disclosure. As illustrated in FIG. 3a, the reachability relation matrix R of the set T of k committed transactions is a k-order matrix, and an element $r_{i,j}$ and an element $r_{j,i}$ in the matrix R indicate the reachability relation between the transactions $t_i$ and the transaction $t_j$, where $1 \le i,j \le k$. In particular, the element $r_{i,j}$ indicates whether the transaction $t_i$ can reach the transaction $t_j$ along one or more directed edges, and the element $r_{j,i}$ indicates whether the transaction $t_j$ can reach the transaction $t_i$ along one or more directed edges.

The forward adjacent vector f and the reachability relation matrix R are inputted into operation 1 (corresponding to the above formula (1)) to calculate the forward reaching vector $p = \{p_1, p_2, p_k\}$. Similarly, the backward adjacent vector b and the reachability relation matrix R are inputted into operation 2 (corresponding to the above formula (2)) to calculate the backward reaching vector $s = \{s_1, s_2, \ldots s_k\}$. Then, the forward reaching vector p and the backward reaching vector s are inputted into a Boolean AND operation to calculate the operation result. If the operation result is equal to 0, it indicates that the two-dimensional digraph does not have a cyclic structure. However, if the operation result is not equal 0, it indicates that the two-dimensional digraph has a cyclic structure.

Preferably, in order to increase the operation speed, an Intellectual Property (IP) module or a Field-Programmable Gate Array (FPGA) module may be added to the processor to process tasks that require bit-level parallel processing such as the transpose operation of a matrix.

Alternatively, in an embodiment of the present disclosure, after committing the transaction to be committed, the reachability relation matrix may be updated according to the forward reaching vector and the backward reaching vector by utilizing the transitivity of the reachability relation between transactions. In this way, upon a new transaction to be committed being received, it may be determined whether the two-dimensional digraph has a cyclic structure according to the updated reachability relation matrix.

FIG. 3b is a schematic diagram of an updated reachability relation matrix according to one embodiment of the present disclosure. The updated reachability matrix R as illustrated in FIG. 3b is a k+1 order matrix. The forward reaching vector $p = \{p_1, p_2, \ldots p_k\}$ is taken as row element, the backward reaching vector $s = \{s_1, s_2, \ldots s_k\}$ is taken as column element, and the element $r_{i,j}$ of the original reachability matrix is updated based on the transitivity of the reachability relation between transactions, so as to obtain an updated element $r'_{i,j}$. Specifically, the transitivity of the reachability relation refers to: $(t_i \triangleleft t_{k+1})$ and $(t_{k+1} \triangleleft t_j) \Rightarrow t_i \triangleleft t_j$. The process for updating the reachability relation matrix according to the transitivity principle may be performed as follows:

$$\text{if}(i = j = k+1), \quad r'_{k+1,k+1} = 1$$
$$\text{if}(i = k+1), \quad r'_{k+1,j} = p_j$$
$$\text{if}(j = k+1), \quad r'_{i,k+1} = s_i$$
$$\text{else } r'_{i,j} = r_{i,j} \mid (p_i \& s_j)$$

wherein the operational symbol denotes an OR operation in a Boolean operation, and the operational symbol & denotes an AND operation in a Boolean operation. That is, when updating the reachability matrix R to a k+1 order matrix, the transaction $t_i$ can each the transaction $t_j$ if and only if: the transaction $t_i$ can reach the transaction $t_j$ before the transaction $t_{k+1}$ is added, or the transaction $t_i$ can reach the transaction $t_j$ via the transaction $t_{k+1}$. In this way, when updating the reachability relation matrix, at most two levels of logic operations are required, thereby shortening the verification time of the optimistic concurrency control algorithm and improving the efficiency of the concurrency control.

Figure 4:
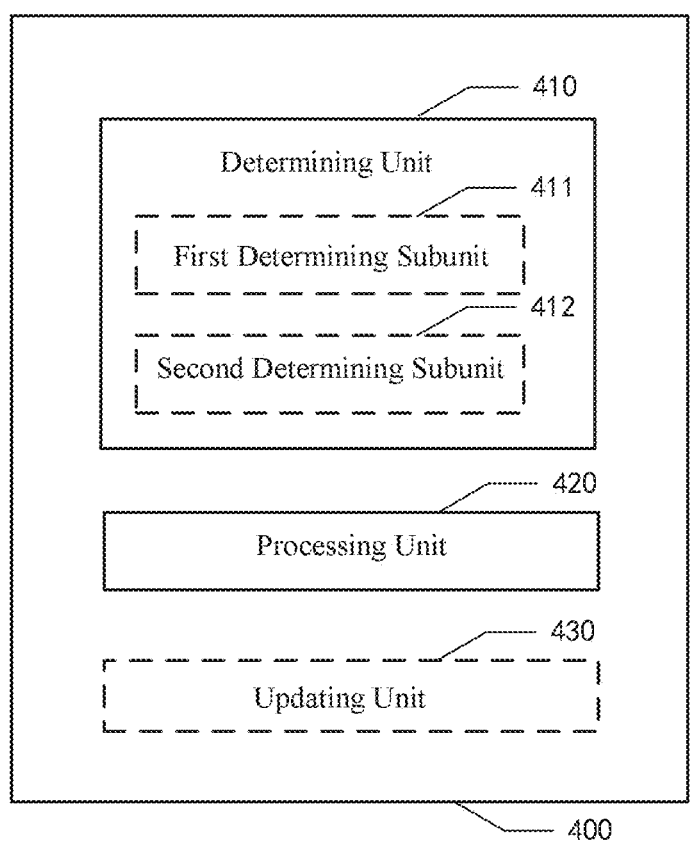
FIG. 4 is a schematic block diagram showing modules of an apparatus for processing concurrent transactions according to an embodiment of the present disclosure.

FIG. 4 is a schematic block diagram showing modules of an apparatus for processing concurrent transactions according to an embodiment of the present disclosure. As illustrated in FIG. 4, the apparatus 400 for processing concurrent transactions may include a determining unit 410 and a processing unit 420. The apparatus 400 for processing concurrent transactions may be used to perform the method described above, and description of the same technical aspect is omitted below in order to avoid redundancy.

The determining unit 410 is configured to determine whether a two-dimensional digraph for a set of concurrent transactions has a cyclic structure. The set of concurrent transactions comprises a transaction to be committed and at least one committed transaction. The two-dimensional digraph comprises a plurality of nodes corresponding respectively to the transactions in the set, and directed edges between the nodes of the two-dimensional digraph indicate serializability relation among the transactions in the set.

The processing unit 420 is configured to not to commit the transaction to be committed if the two-dimensional digraph has a cyclic structure, and to commit the transaction to be committed if the two-dimensional digraph does not have a cyclic structure.

It should be understood that, a common mathematical tool used to store a two-dimensional digraph in a computer is a matrix. Thus, both using a two-dimensional digraph to represent a serializability relation between transactions and using a matrix to represent a serializability relation between transactions should fall within the scope of embodiments of the present disclosure. According to the above technical solution of the present disclosure, the problem of excessive constraint in the conventional optimistic concurrency control algorithm can be avoided, thereby reducing the abort rate of transactions. Therefore, embodiments of the present disclosure can improve the performance of a concurrent system.

Alternatively, in an embodiment of the present disclosure, the determining unit 410 is configured to determine whether a combination of a first node and a second node exists among the nodes of the two-dimensional digraph, wherein the first node can reach the second node along one or more directed edges, and the second node can reach the first node along one or more directed edges; determine that the two-dimensional digraph has the cyclic structure if the combination of the first node and the second node exists among the nodes of the two-dimensional digraph; and determine that the two-dimensional digraph does not have the cyclic structure if the combination of the first node and the second node does not exist among the nodes of the two-dimensional digraph.

Alternatively, in an embodiment of the present disclosure, the determining unit 410 includes a first determining subunit 411 and a second determining subunit 412. The first determining subunit 411 is configured to determine a forward adjacent vector and a backward adjacent vector between the transaction to be committed and the at least one committed transaction, wherein the forward adjacent vector indicates whether a directed edge directed away from the transaction to be committed exists between the transaction to be committed and each of the at least one committed transaction, and the backward adjacent vector indicates whether a directed edge directed toward the transaction to be committed exists between the transaction to be committed and each of the at least one committed transaction. The second determining subunit 412 is configured to determine whether the first node and the second node exist among the nodes of the two-dimensional digraph according to the forward adjacent vector, the backward adjacent vector, and a reachability relation matrix of the at least one committed transaction, wherein the reachability relation matrix indicates a reachability relation between the transactions of the at least one committed transaction. The embodiment of the present disclosure determines whether the two-dimensional digraph has a cyclic structure according to the reachability relations between the transaction to be committed and respective ones of the at least one committed transaction. Compared with the scheme of determination based on traversing each of the nodes of the two-dimensional digraph, the embodiment of the present disclosure greatly reduces the amount of calculation, thereby improving the operation efficiency of the concurrency control system.

Alternatively, in an embodiment of the present disclosure, the first determining subunit 411 is configured to determine the forward adjacent vector and the backward adjacent vector according to a read-write collision or a write-write collision for the shared object between a read/write operation in the transaction to be committed and a read/write operation in respective ones of the at least one committed transaction.

Alternatively, in an embodiment of the present disclosure, the shared object is a memory address or a primary key value of a relation database. For example, in a database system, the shared object is a primary key value. In a transactional memory system, the shared object is a memory address.

Alternatively, in an embodiment of the present disclosure, the second determining subunit 412 is configured to determine whether a first node and second node exist according to the following formulas (1) and (2):

$$p = f + R^T \times f; \quad (1)$$

$$s = b + R \times b; \quad (2)$$

If $p^T \times s \neq 0$, it is determined that a combination of a first node and a second node exists among the nodes of the two-dimensional digraph; if $p^T \times s = 0$, it is determined that a combination of a first node or a second node does not exist among the nodes of the two-dimensional digraph.

Here f denotes the forward adjacent vector, b denotes the backward adjacent vector, R denotes the reachability relation matrix, $R^T$ denotes a transposed matrix of R, p denotes a forward reaching vector, and s denotes a backward reaching vector, $p^T$ denotes a transposed vector of p, the operational symbol + denotes the matrix addition in the Boolean algebra, and the operational symbol × denotes the matrix multiplication in the Boolean algebra.

Alternatively, in an embodiment of the invention, the apparatus 400 for processing concurrent transactions further includes an updating unit 430. The updating unit 430 is configured to update the reachability relation matrix according to the forward reaching vector and the backward reaching vector by utilizing the transitivity of the reachability relation between transactions. In this way, when updating the reachability relation matrix, at most two levels of logic operations are required, thereby shortening the verification time of the optimistic concurrency control algorithm and improving the efficiency of the concurrency control.

It should be understood that the determining unit 410, the first determining subunit 411, the second determining subunit 412, the processing unit 420, and the updating unit 430 may be integrated in one module, or any of the modules may be separated into a plurality of modules.

Alternatively, at least some of the functionality of one or more of the modules may be combined with at least some of the functionality of other modules and implemented in one module. According to an embodiment of the present disclosure, at least one of the determining unit 410, the first determining subunit 411, the second determining subunit 412, the processing unit 420 and the updating unit 430 may be at least partially implemented as a hardware circuit, such as a Field Programmable Gate Array (FPGA), a Programmable Logic Array (PLA), a System on Chip, a System on Substrate, a System on Package, an Application Specific Integrated Circuit (ASIC), or implemented in a hardware or firmware integrating or packaging a circuit or operating on a circuit in any other reasonable way etc., or implemented in a combination of software, hardware, and firmware.

Alternatively, at least one of the determining unit 410, the first determining subunit 411, the second determining subunit 412, the processing unit 420, and the updating unit 430 may be at least partially implemented as a computer program module including a program, which when run by a computer, may cause the function of respective modules to be performed.

Figure 5:
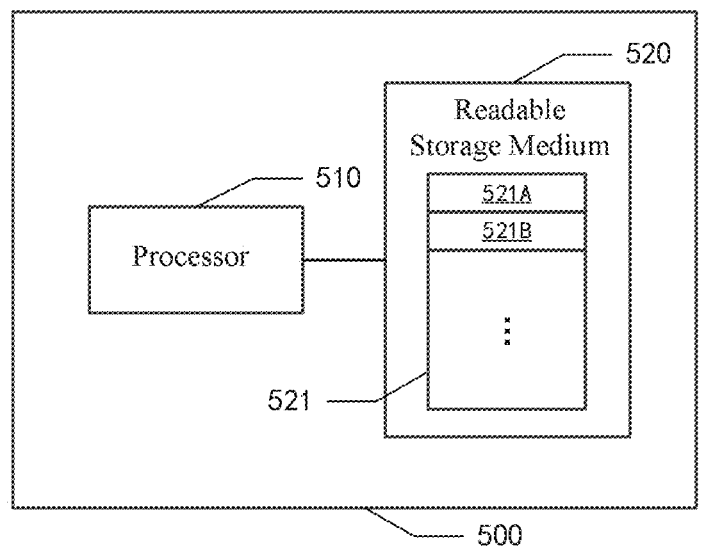
FIG. 5 is a schematic block diagram of an apparatus for processing concurrent transactions according to an embodiment of the present disclosure.

FIG. 5 is a schematic block diagram of an apparatus for processing concurrent transactions according to an embodiment of the present disclosure. As illustrated in FIG. 5, the apparatus for processing concurrent transactions 500 includes a processor 510 and a computer readable storage medium 520. The apparatus for processing concurrent transactions 500 can implement the method described above with reference to FIGS. 1-3b.

In particular, the processor 510 may include, for example, a general purpose microprocessor, an instruction set processor, and/or a related chipset and/or a reconfigurable processor and/or a special purpose microprocessor (e.g., an application specific integrated circuit (ASIC)) etc. The processor 510 may further include an onboard memory for caching. The processor 510 may be a single processing unit or a plurality of processing units for performing different actions of the method according to embodiments of the present disclosure described with reference to FIGS. 1-3b.

The computer readable storage medium 520 may be, for example, any medium that can contain, store, communicate, propagate or transmit instructions. For example, the readable storage medium may include, but is not limited to, an electronic, magnetic, optical, electromagnetic, infrared, or semiconductor system, apparatus, device, or propagation medium. Examples of the readable storage medium may include: a magnetic storage apparatus such as a magnetic tape or a hard disk (HDD); an optical storage apparatus such as a compact disk (CD-ROM); a memory such as a random access memory (RAM) or a flash memory; and/or a wired/wireless communication link.

The computer readable storage medium 520 may include a computer program 521 that may include code/computer executable instructions that, when executed by the processor 510, cause the processor 510 to perform, for example, the operations described above in connection with FIGS. 1-3b and any variations thereof.

The computer program 521 may be configured to have computer program code including, for example, a computer program module. For example, in an example embodiment, the code in the computer program 521 may include one or more program modules, including, for example, a module 521A, a module 521B, and so on. It should be noted that the division scheme and the number of modules may vary, and those skilled in the art may use suitable program modules or a combination thereof according to actual situations. Such combination of program modules, when executed by the processor 510, may cause the processor 510 to perform, for example, the method described above in connection with FIGS. 1-3b and any variations thereof.

According to an embodiment of the present disclosure, at least one of the determining unit 410, the first determining subunit 411, the second determining subunit 412, the processing unit 420, and the updating unit 430 may be implemented as the computer program module described with reference to FIG. 5, which when executed by the processor 510, may cause respective operations described above to be implemented.

The above described methods, apparatus, units and/or modules according to various embodiments of the present disclosure may be implemented by executing, by an electronic device with computational capacity, software including computer instructions. The apparatus may include a storage device to implement the various storage functions described above. The electronic device with computational capacity may include, but is not limited to, an apparatus capable of executing computer instructions such as a general purpose processor, a digital signal processor, a dedicated processor, a reconfigurable processor, etc. Such instructions, when executed by the electronic device, may cause the electronic device to be configured to perform the above operations according to the present disclosure. The various devices and/or modules described above may be implemented in one electronic device or in different electronic devices. The software may be stored in a computer readable storage medium. The computer readable storage medium stores one or more programs (software modules) including instructions that, when executed by one or more processors in an electronic device, cause the electronic device to perform the method according to the present disclosure.

The software may be stored in the form of a volatile memory or a non-volatile storage (such as a storage device such as a ROM) that is erasable or rewritable, or stored in the form of a memory (e.g., a RAM, a memory chip, a device or an integrated circuit), or stored on an optically readable medium or a magnetically readable medium (e.g., a CD, a DVD, a magnetic disk or a magnetic tape, etc.). It should be appreciated that the storage device and the storage medium are embodiments of a machine-readable storage apparatus adapted to store one or more programs including instructions that, when executed, cause the embodiments of the present disclosure to be implemented. The embodiment of the present disclosure provides a program and a machine readable storage apparatus storing such program including code for implementing the apparatus or method of any of the claims of the present disclosure. Moreover, such program may be communicated via any medium, such as a communication signal carried via a wired connection or a wireless connection, and the same may be suitably included in various embodiments.

Those skilled in the art will appreciate that features recited in the various embodiments and/or claims of the present disclosure may be combined in various combinations, even if such combinations are not explicitly described in the present disclosure. In particular, features recited in the various embodiments and/or claims of the present disclosure may be combined in various combinations without departing from the spirit and scope of the invention. All such combinations fall within the scope of the invention.

Although the present disclosure has been illustrated and described with reference to specific exemplary embodiments of the present disclosure, it is to be appreciated by those skilled in the art that various changes in form and detail may be made to the present disclosure without departing from the spirit and scope of the invention defined by the appended claims and their equivalents. Therefore, the scope of the present disclosure should not be limited to the above-described embodiments, but should be determined by the appended claims and equivalents thereof.

The invention claimed is:

1. A method of processing concurrent transactions, the method comprising:
    determining whether a two-dimensional digraph for a set of concurrent transactions has a cyclic structure, wherein the set of concurrent transactions comprises a transaction to be committed and at least one committed transaction, the two-dimensional digraph comprises a plurality of nodes corresponding respectively to the transactions in the set, and directed edges between the nodes of the two-dimensional digraph indicate a serializability relation among the transactions in the set;
    aborting the transaction to be committed if it is determined that the two-dimensional digraph has the cyclic structure; and
    committing the transaction to be committed if it is determined that the two-dimensional digraph does not have the cyclic structure;
    wherein determining whether the two-dimensional digraph for the set of concurrent transactions has the cyclic structure comprises:
        determining whether a combination of a first node and a second node exists among the nodes of the two-dimensional digraph, wherein the first node can reach the second node along one or more directed edges, and the second node can reach the first node along one or more directed edges;
        determining that the two-dimensional digraph has the cyclic structure if the combination of the first node and the second node exists among the nodes of the two-dimensional digraph; and
        determining that the two-dimensional digraph does not have the cyclic structure if the combination of the first node and the second node does not exist among the nodes of the two-dimensional digraph;
    wherein determining whether the combination of the first node and the second node exists among the nodes of the two-dimensional digraph comprises:
        determining a forward adjacent vector and a backward adjacent vector between the transaction to be committed and the at least one committed transaction, wherein the forward adjacent vector indicates whether a directed edge directed away from the transaction to be committed exists between the transaction to be committed and each of the at least one committed transaction, and the backward adjacent vector indicates whether a directed edge directed toward the transaction to be committed exists between the transaction to be committed and each of the at least one committed transaction; and
        determining whether the combination of the first node and the second node exists among the nodes of the two-dimensional digraph according to the forward adjacent vector, the backward adjacent vector, and a reachability relation matrix of the at least one committed transaction, wherein the reachability relation matrix indicates a reachability relation between the transactions of the at least one committed transaction; and
    wherein determining whether the combination of the first node and the second node exists among the nodes of the two-dimensional digraph according to the forward adjacent vector, the backward adjacent vector, and the reachability relation matrix of the at least one committed transaction comprises:
        determining whether the combination of the first node and the second node exists according to formulas (1) and (2):

$$p = f + R^T \times f \quad (1);$$

$$s = b + R \times b \quad (2);$$

if $p^T \times s \neq 0$, determining that the combination of the first node and the second node exists among the nodes of the two-dimensional digraph; and
        if $p^T \times s = 0$, determining that the combination of the first node and the second node does not exist among the nodes of the two-dimensional digraph;
        wherein f denotes the forward adjacent vector, b denotes the backward adjacent vector, R denotes the reachability relation matrix, $R^T$ denotes a transposed matrix of the reachability relation matrix R, p denotes a forward reaching vector, s denotes a backward reaching vector, $p^T$ denotes a transposed vector of the forward reaching vector p, + denotes matrix addition in Boolean algebra, and × denotes matrix multiplication in Boolean algebra.

2. The method of claim 1,
    wherein determining the forward adjacent vector and the backward adjacent vector between the transaction to be committed and the at least one committed transaction comprises:
        determining the forward adjacent vector and the backward adjacent vector according to a read-write collision or a write-write collision for a shared object between a read/write operation in the transaction to be committed and a read/write operation in each of the at least one committed transaction.

3. The method of claim 2,
    wherein the shared object is a memory address or a primary key value of a relation database.

4. The method of claim 1,
    wherein the method further comprises, after committing the transaction to be committed,
        updating the reachability relation matrix according to the forward reaching vector and the backward reaching vector by utilizing transitivity of the reachability relation between transactions.

5. An apparatus for processing concurrent transactions, comprising:

one or more processors;

a memory for storing one or more programs;

wherein the one or more programs, when executed by the one or more processors, cause the one or more processors to perform operations comprising:

determining whether a two-dimensional digraph for a set of concurrent transactions has a cyclic structure, wherein the set of concurrent transactions comprises a transaction to be committed and at least one committed transaction, the two-dimensional digraph comprises a plurality of nodes corresponding respectively to the transactions in the set, and directed edges between the nodes of the two-dimensional digraph indicates a serializability relation among the transactions in the set;

aborting the transaction to be committed if it is determined that the two-dimensional digraph has the cyclic structure; and committing the transaction to be committed if it is determined that the two-dimensional digraph does not have the cyclic structure;

wherein determining whether the two-dimensional digraph for the set of concurrent transactions has the cyclic structure comprises:

determining whether a combination of a first node and a second node exists among the nodes of the two-dimensional digraph, wherein the first node can reach the second node along one or more directed edges, and the second node can reach the first node along one or more directed edges;

determining that the two-dimensional digraph has the cyclic structure if the combination of the first node and the second node exists among the nodes of the two-dimensional digraph; and determining that the two-dimensional digraph does not have the cyclic structure if the combination of the first node and the second node does not exist among the nodes of the two-dimensional digraph;

wherein determining whether the combination of the first node and the second node exists among the nodes of the two-dimensional digraph comprises:

determining a forward adjacent vector and a backward adjacent vector between the transaction to be committed and the at least one committed transaction, wherein the forward adjacent vector indicates whether a directed edge directed away from the transaction to be committed exists between the transaction to be committed and each of the at least one committed transaction, and the backward adjacent vector indicates whether a directed edge directed toward the transaction to be committed exists between the transaction to be committed and each of the at least one committed transaction; and determining whether the combination of the first node and the second node exists among the nodes of the two-dimensional digraph according to the forward adjacent vector, the backward adjacent vector, and a reachability relation matrix of the at least one committed transaction, wherein the reachability relation matrix indicates a reachability relation between the transactions of the at least one committed transaction; and wherein determining whether the combination of the first node and the second node exists among the nodes of the two-dimensional digraph according to the forward adjacent vector, the backward adjacent vector, and the reachability relation matrix of the at least one committed transaction comprises:

determining whether the combination of the first node and the second node exists according to formulas (1) and (2):

$$p = f + R^T \times f \qquad (1)$$

$$s = b + R \times b \qquad (2);$$

if $p^T \times s \neq 0$, determining that the combination of the first node and the second node exists among the nodes of the two-dimensional digraph; and if $p^T \times s = 0$, determining that the combination of the first node and the second node does not exist among the nodes of the two-dimensional digraph;

wherein f denotes the forward adjacent vector, b denotes the backward adjacent vector, R denotes the reachability relation matrix, $R^T$ denotes a transposed matrix of the reachability relation matrix R, p denotes a forward reaching vector, s denotes a backward reaching vector, $p^T$ denotes a transposed vector of the forward reaching vector p, + denotes matrix addition in Boolean algebra, and x denotes matrix multiplication in Boolean algebra.

6. The apparatus of claim 5, wherein determining the forward adjacent vector and the backward adjacent vector between the transaction to be committed and the at least one committed transaction comprises:

determining the forward adjacent vector and the backward adjacent vector according to a read-write collision or a write-write collision for a shared object between a read/write operation in the transaction to be committed and a read/write operation in each of the at least one committed transaction.

7. The apparatus of claim 6, wherein the shared object is a memory address or a primary key value of a relation database.

8. The apparatus of claim 5, wherein the one or more programs, when executed by the one or more processors, cause the one or more processors to perform operations further comprising:

updating, after committing the transaction to be committed, the reachability relation matrix according to the forward reaching vector and the backward reaching vector by utilizing transitivity of the reachability relation between transactions.

9. A non-transitory computer readable storage medium, wherein the non-transitory computer readable storage medium stores instructions, when executed by one or more processors, cause the one or more processors to perform operations comprising:

determining whether a two-dimensional digraph for a set of concurrent transactions has a cyclic structure, wherein the set of concurrent transactions comprises a transaction to be committed and at least one committed transaction, the two-dimensional digraph comprises a plurality of nodes corresponding respectively to the transactions in the set, and directed edges between the nodes of the two-dimensional digraph indicate a serializability relation among the transactions in the set;

aborting the transaction to be committed if it is determined that the two-dimensional digraph has the cyclic structure; and committing the transaction to be committed if it is determined that the two-dimensional digraph does not have the cyclic structure;
wherein determining whether the two-dimensional digraph for the set of concurrent transactions has the cyclic structure comprises:
determining whether a combination of a first node and a second node exists among the nodes of the two-dimensional digraph, wherein the first node can reach the second node along one or more directed edges, and the second node can reach the first node along one or more directed edges;
determining that the two-dimensional digraph has the cyclic structure if the combination of the first node and the second node exists among the nodes of the two-dimensional digraph; and
determining that the two-dimensional digraph does not have the cyclic structure if the combination of the first node and the second node does not exist among the nodes of the two-dimensional digraph;
wherein determining whether the combination of the first node and the second node exists among the nodes of the two-dimensional digraph comprises:
determining a forward adjacent vector and a backward adjacent vector between the transaction to be committed and the at least one committed transaction, wherein the forward adjacent vector indicates whether a directed edge directed away from the transaction to be committed exists between the transaction to be committed and each of the at least one committed transaction, and the backward adjacent vector indicates whether a directed edge directed toward the transaction to be committed exists between the transaction to be committed and each of the at least one committed transaction; and
determining whether the combination of the first node and the second node exists among the nodes of the two-dimensional digraph according to the forward adjacent vector, the backward adjacent vector, and a reachability relation matrix of the at least one committed transaction, wherein the reachability relation matrix indicates a reachability relation between the transactions of the at least one committed transaction; and
wherein determining whether the combination of the first node and the second node exists among the nodes of the two-dimensional digraph according to the forward adjacent vector, the backward adjacent vector, and the reachability relation matrix of the at least one committed transaction comprises:
determining whether the combination of the first node and the second node exists according to formulas (1) and (2):

$$p = f + R^T \times f \quad (1);$$

$$s = b + R \times b \quad (2);$$

if $p^T \times s \neq 0$, determining that the combination of the first node and the second node exists among the nodes of the two-dimensional digraph; and
if $p^T \times s = 0$, determining that the combination of the first node and the second node does not exist among the nodes of the two-dimensional digraph;
wherein f denotes the forward adjacent vector, b denotes the backward adjacent vector, R denotes the reachability relation matrix, $R^T$ denotes a transposed matrix of the reachability relation matrix R, p denotes a forward reaching vector, s denotes a backward reaching vector, $p^T$ denotes a transposed vector of the forward reaching vector p, + denotes matrix addition in Boolean algebra, and × denotes matrix multiplication in Boolean algebra.

10. The non-transitory computer readable storage medium of claim 9,
wherein determining the forward adjacent vector and the backward adjacent vector between the transaction to be committed and the at least one committed transaction comprises:
determining the forward adjacent vector and the backward adjacent vector according to a read-write collision or a write-write collision for a shared object between a read/write operation in the transaction to be committed and a read/write operation in each of the at least one committed transaction.

11. The non-transitory computer readable storage medium of claim claim 9,
wherein the instructions, when executed by the one or more processors, cause the one or more processors to performing operations further comprising:
updating, after committing the transaction to be committed, the reachability relation matrix according to the forward reaching vector and the backward reaching vector by utilizing transitivity of the reachability relation between transactions.

* * * * *